(12) United States Patent
Park

(10) Patent No.: US 11,905,131 B2
(45) Date of Patent: Feb. 20, 2024

(54) PNEUMATIC AIR BOOSTER

(71) Applicant: Won Jin Park, Incheon (KR)

(72) Inventor: Won Jin Park, Incheon (KR)

( * ) Notice: Subject to any disclaimer, the term of this patent is extended or adjusted under 35 U.S.C. 154(b) by 108 days.

(21) Appl. No.: 17/778,837

(22) PCT Filed: Nov. 12, 2020

(86) PCT No.: PCT/KR2020/015862
§ 371 (c)(1),
(2) Date: May 21, 2022

(87) PCT Pub. No.: WO2021/107466
PCT Pub. Date: Jun. 3, 2021

(65) Prior Publication Data
US 2022/0402706 A1 Dec. 22, 2022

(30) Foreign Application Priority Data
Nov. 29, 2019 (KR) .................. 10-2019-0156643

(51) Int. Cl.
*B65G 53/50* (2006.01)
*B65G 53/06* (2006.01)
*F16K 27/02* (2006.01)
*F16K 17/04* (2006.01)

(52) U.S. Cl.
CPC ............. *B65G 53/50* (2013.01); *B65G 53/06* (2013.01); *F16K 17/04* (2013.01); *F16K 27/02* (2013.01); *B65G 2201/04* (2013.01); *B65G 2812/165* (2013.01); *B65G 2812/1625* (2013.01); *Y10T 137/7792* (2015.04)

(58) Field of Classification Search
CPC .... B65G 53/50; B65G 53/06; B65G 2201/04; B65G 2812/1625; B65G 2812/165; Y10T 137/7792; F16K 17/04–105; F16K 27/02
USPC .......................................................... 137/504
See application file for complete search history.

(56) References Cited

U.S. PATENT DOCUMENTS 2,719,534 A * 10/1955 Williams ................. F15B 3/00
137/86
3,754,730 A * 8/1973 Nilles .................. F25B 41/325
251/28
(Continued)

FOREIGN PATENT DOCUMENTS

| KR | 10-1989-0007007 A | 6/1989 |
| KR | 10-2000-0028133 A | 5/2000 |
| KR | 20-2001-0000663 U | 1/2001 |

(Continued)

OTHER PUBLICATIONS

International Search Report of PCT/KR2020/015862 published on Jun. 3, 2021.
Written opinion of PCT/KR2020/015862 published on Jun. 3, 2021.

*Primary Examiner* — John Bastianelli

(57) ABSTRACT

A pneumatic air booster (100) includes; a shaft (160); a body (110, 111) including a first body (110) and a second body (111); an air inlet (112); an air outlet (113); a pressure chamber (114) communicating the air inlet (112); an air control passage (115) communicating the pressure chamber (114); a pressure control chamber (116); a bonnet (190); a valve (140); a valve spring (150); a valve seat (170); and a connection passage (102a) extended between the air outlet (113) and the pressure control chamber (116).

3 Claims, 3 Drawing Sheets

(56) References Cited

U.S. PATENT DOCUMENTS

2008/0290313 A1    11/2008   Larsen
2016/0061341 A1*    3/2016   Broschka ................ F16K 17/04
                                                                                 137/12

FOREIGN PATENT DOCUMENTS

| KR | 10-2001-0103828 A | 11/2001 |
| KR | 10-2004-0089779 A | 10/2004 |
| KR | 10-0584774 B1 | 5/2006 |
| KR | 10-0727785 B1 | 6/2007 |

* cited by examiner

PNEUMATIC AIR BOOSTER

TECHNICAL FIELD

The present invention relates to a pneumatic air booster, and more particularly, relates to a pneumatic air booster which is installed in a pipeline through which objects move, of high-density transfer equipment for transferring heavy objects with high specific gravity such as sand and limestone, and increases the amount of air in proportion to an increase in outlet pressure that can lead to the stabilization of the pipeline.

BACKGROUND OF THE INVENTION

Recently, studies on a pneumatic conveying system that flows a gas such as air or nitrogen gas using a device such as a blower or a compressor and transfers heavy objects with high specific gravity such as sand, limestone, etc. using the flowing gas is being actively studied.

Such the pneumatic conveying system must include a plurality of air regulators to adjust pressure and a sensor for measuring pressure to control the same, and thus the installation structure is complicated and there is a problem of increasing costs for establishing an overall monitoring and control system.

Meanwhile, an air regulator is a device that maintains a constant outlet pressure in a situation in which the inlet pressure varies in general, and is absolutely necessary to safely operate various equipments. As prior art related to such an air regulator, Korean Patent Registration No. 10-0727785 (Reference 1), Korean Patent Publication No. 2000-0028133 (Reference 2), etc. have been proposed.

Reference 1 relates to a regulator for gas pressure reduction, for reducing the gas fuel pressure and adjusting the gas fuel amount, the regulator comprises a body in which a high-pressure chamber and a spring chamber are separately formed, a first cover installed outside the high-pressure chamber of the body, a second cover installed outside the spring chamber of the body, a valve seat installed in the high-pressure chamber and having an orifice therein, a diaphragm installed between the spring chamber and the second cover, an opening/closing control shaft that opens and closes the orifice of the valve seat as the diaphragm is lifted, and a connecting pipeline that connects the first cover and the second cover. According to this constitution, when the pressure of the gas fuel on the gas outlet side increases, the gas fuel supplied to the outlet passage is supplied to the decompression passage through the connecting pipeline, and as the pressure of the gas fuel supplied to the decompression passage increases, the diaphragm is pressed and lowered in the direction of the spring chamber, and as the second spring is compressed and the opening/closing control shaft is simultaneously lowered, the orifice of the valve sheet is blocked, thereby blocking the supply of the gas fuel.

Next, Reference 2 relates to an air valve, which includes a fluid passage part, a spring installed on the upper side of the fluid passage part and installed inside the fluid passage part, and an opening/closing operation part that regulates the flow of fluid through the fluid passage by the compressed air supplied into the fluid passage part, and when compressed air is supplied into the opening/closing operation part through the air supply port, the compressed air applies pressure to the piston, and thus the piston overcomes an elastic force of the spring and is lowered, and thus the valve stem is also lowered, the valve head is in close contact with the valve seat and the fluid passage is closed.

Both References 1 and 2 are constitutions that block the supply of gas fuel or close the fluid passage by blocking the orifice of the valve seat when the gas fuel flows into the decompression passage and thus pressure increases or compressed air is supplied into the opening/closing operation part.

Therefore, in the case of high-density transfer equipment for transferring heavy objects with high specific gravity such as sand and limestone, when the inside of the pipeline through which the objects move is filled with objects, the pressure increases, so more air should be supplied to transfer the objects to reduce the pressure in the pipeline, however, if a known air regulator such as References 1 and 2 is applied, it is rather blocked when the pressure increases, so it is difficult to expect smooth transfer of the object in the pipeline.

DETAILED DESCRIPTION OF THE INVENTION

Technical Problem

Therefore, the present invention for solving the problems of the prior art has a purpose to provide a pneumatic air booster which is installed in a pipeline through which objects move, of high-density transfer equipment for transferring heavy objects with high specific gravity such as sand and limestone, and increases the amount of air supplied into the pipeline when the outlet pressure increases, thereby smoothly transferring the objects.

In particular, the present invention has a purpose to provide a pneumatic air booster that reduces the amount of air when the outlet pressure is less than or equal to the set pressure and increases the amount of air in proportion to the outlet pressure when the outlet pressure exceeds the set pressure, thereby lowering the pressure in the pipeline through the transfer of objects in the pipeline.

Technical Solution

The present invention in order to solve this technical problem provides a pneumatic air booster comprising; a first body with an air inlet and an air outlet formed on the side of the second body, and a pressure chamber and an air control passage communicating with the air inlet and the air outlet, which are formed in the lower part of the second body; a bonnet that is coupled to the upper part of the first body and forms a pressure control chamber; a lower cover that closes the pressure chamber of the first body; a valve installed inside the pressure chamber to open and close the air control passage; a valve spring installed in the pressure chamber to press the valve upward; a shaft which passes through the pressure chamber and the pressure control chamber and has a lower end coupled to the valve to lift and lower the valve to open and close the air control passage; a valve seat provided in the pressure control chamber in a manner of being lifted and lowered and supported on and upper end of the shaft; and is characterized in that a connection passage communicating with the air outlet of the first body and the pressure control chamber of the bonnet is formed, and when the air of the air outlet flows into the pressure control chamber through the connection passage and the pressure increases, the valve seat is pushed downward.

At this time, it is characterized in that the air outlet of the first body and the pressure control chamber of the bonnet are connected by a connecting pipeline in which the connection passage (102a) is formed.

And it is characterized in that a support hole communicating with the pressure chamber of the first body is formed in the lower cover, and a tension adjuster for adjusting the tension of the valve spring is screwed into the support hole.

Effects of the Invention

According to the present invention, it is possible to minimize the amount of air supplied to a pipeline, through which objects move, of high-density transfer equipment for transferring heavy objects with high specific gravity such as sand and limestone in a blower, a compressor or the like, and enable smooth transfer of the objects in the pipeline and reduce even the impact to the pipeline so as to be advantageous in maintenance and repair of equipment.

In addition, the pneumatic air booster according to the present invention is independently operated when the air booster is applied to a pneumatic conveying system, so as to enable pressure adjustment of the pipeline, so that a monitoring and control system is simplified, and thus costs for constructing the system can be reduced.

BEST MODE FOR CARRYING OUT THE INVENTION

Hereinafter, the features of the pneumatic air booster according to the present invention will be understood by embodiments described in detail with reference to the attached drawings.

Since the present invention can have various changes and can have various forms, embodiments will be described in detail in the present specification. However, this is not intended to limit the present invention to a specific disclosed form, it should be understood to include all modifications, equivalents and substitutes included in the spirit and scope of the present invention.

Figure 1:
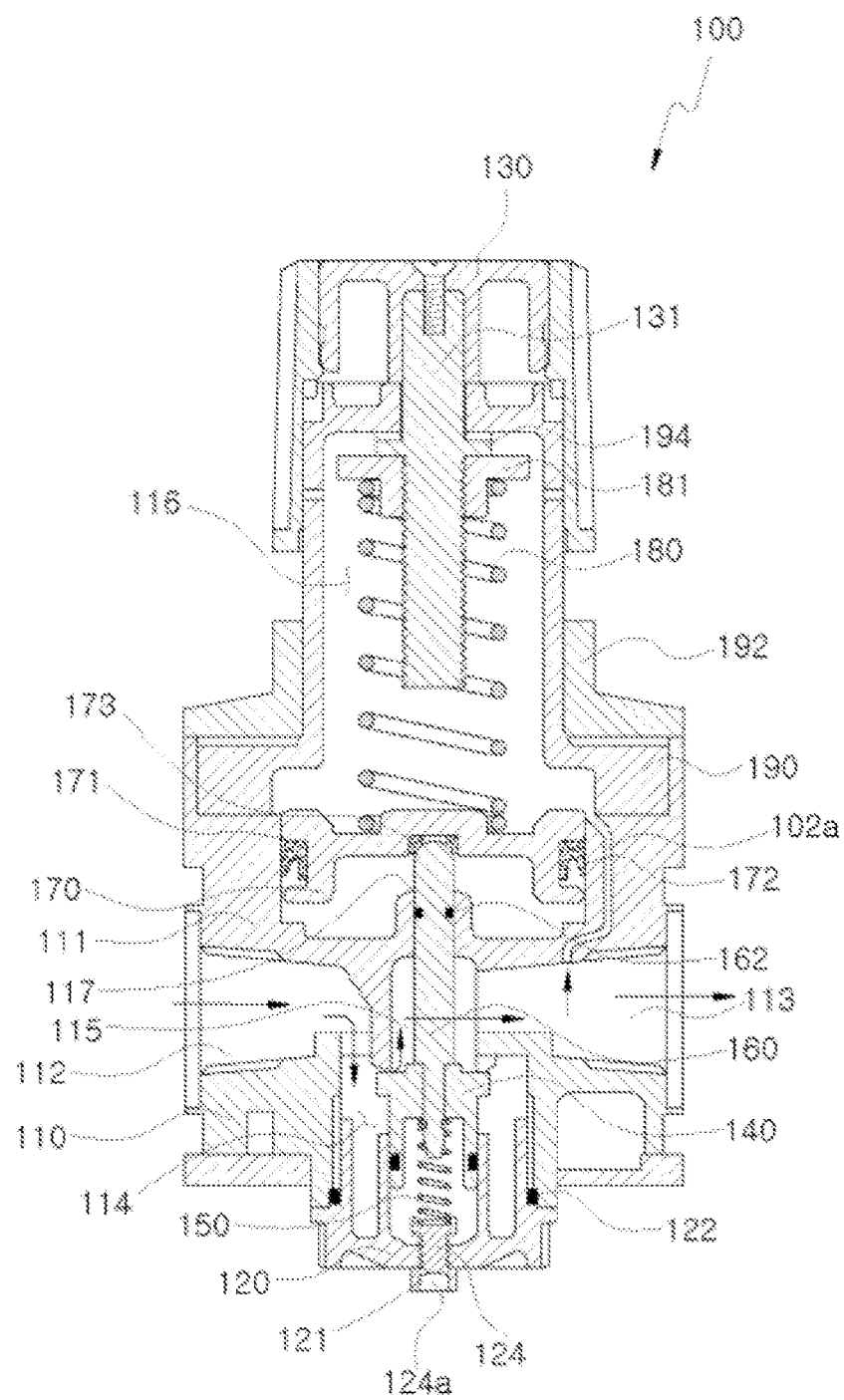
FIG. 1 is a cross-sectional view illustrating a structure of a pneumatic air booster according to a first embodiment of the present invention.
Figure 2:
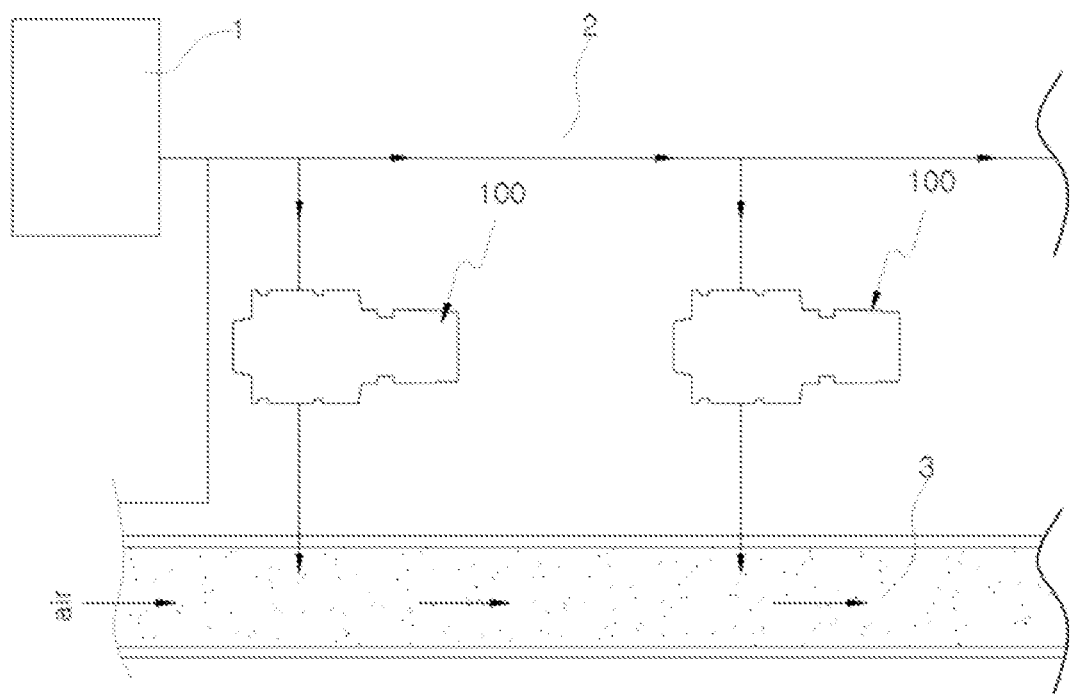
FIG. 2 is a configuration diagram illustrating an installation example of a pneumatic air booster according to the present invention.

According to FIGS. 1 and 2, the pneumatic air booster (100) according to the present invention receives air supplied through an air line (2) from an air supply source (1) such as a blower or a compressor, controls the discharge, and supplies the air to the pipeline (3) through which objects move, of high-density transfer equipment for transferring heavy objects with high specific gravity such as sand and limestone.

This pneumatic air booster (100) of the present invention comprises a first body (110) with an air inlet (112) and an air outlet (113) formed on the side of the second body (111), and a pressure chamber (114) and an air control passage (115) communicating with the air inlet (112) and the air outlet (113), which are formed in the lower part of the second body (111), a bonnet (190) that is coupled to the upper part of the first body (110) and forms a pressure control chamber (116), a lower cover (120) that closes the pressure chamber (114) of the first body (110), an upper cover (130) that closes the upper part of the bonnet (190), a valve (140) installed inside the pressure chamber (114) to open and close the air control passage (115), a valve spring (150) installed in the pressure chamber (114) to press the valve (140) upward, a shaft (160) which passes through the pressure chamber (114) and the pressure control chamber (116) and has a lower end coupled to the valve (140) to lift and lower the valve (140) to open and close the air control passage (115), a valve seat (170) provided in the pressure control chamber (116) in a manner of being lifted and lowered and supported on and upper end of the shaft (160), and an adjustment spring (180) provided in the pressure control chamber (116) to press the valve seat (170) downward.

At this time, the bonnet (190) and a fixing nut (192) are coupled to the upper side of the first body (110), and a liner (194) is provided at the inner upper end of the bonnet (190) to be coupled to the upper cover (130).

This present invention forms a connection passage (102a) communicating with the air outlet (113) and the pressure control chamber (116) of the first body (110), and when the pressure of the air outlet (113) increases, the present invention injects air into the pressure control chamber (116) to induce the pressure increase of the pressure control chamber (116), and presses the valve seat (170) downward to lower the shaft (160) to expand the air control passage (115). Of course, when the pressure of the pressure control chamber (116) decreases, the valve seat (170) returns upward and the air control passage (115) is reduced.

Hereinafter, the present invention will be specifically described.

The first body (110) has an air inlet (112) formed on one side of the second body (111), an air outlet (113) is formed on the other side of the second body (111), and a pressure chamber (114) is formed at a central lower part of the second body (111), and an air control chamber (115) is formed on the upper side of the pressure chamber (114) to communicate with each other. In this structure, the air inlet (112) is connected to the pressure chamber (114) and the air control passage (115) is connected to the air outlet (113), so that the air supplied from a blower or a compressor moves to the air outlet (113) through the air inlet (112), the pressure chamber (114), and the air control passage (115).

In addition, the first body (110) is coupled to the bonnet (190) in which the pressure control chamber (116) is formed, in which the control spring (180) and the valve seat (170) are installed in the upper center of the second body (111).

In this first body (110), a connection passage (102a) that communicates with the air outlet (113) and the pressure control chamber (116) is formed. At this time, one end of the connection passage (102a) communicates with the air outlet (113) and the other end communicates with the pressure control chamber (116). In this case, the inlet/outlet of the pressure control chamber (116) communicating with the connection passage (102a) is located relatively above the valve seat (170) or is formed to face upward, and when the air of the air outlet (113) flows through the connection passage (102a) and thus the internal pressure of the pressure control chamber (116) increases, the valve seat (170) may be lowered by pressing the upper part of the valve seat (170).

The lower cover (120) is coupled to the lower part of the first body (110) and closes the pressure chamber (114) of the first body (110), and the bonnet (190) and the upper cover (130) are coupled to the upper pan of the first body (110) and close the pressure control chamber (116) to prevent external air from being arbitrarily flowed into the pressure chamber (114) and the pressure control chamber (116). At this time, when closing the pressure chamber (114) of the first body (110) with the lower cover (120), an O-ring (122) is fitted to maintain airtightness.

A valve (140) for opening and closing the air control passage (115) is provided in this pressure chamber (114) of the first body (110) to be lifted and lowered, and a valve spring (150) is provided at the lower side of the valve (140) to press the valve (140) in the upward direction. At this time, when the valve (140) is lifted and closes the entrance of the air control passage (115), the air supplied from the air inlet (112) is blocked from moving to the air outlet (113), and when the valve (140) is lowered and opens the entrance of the air control passage (115), the air supplied from the air inlet (112) moves to the air outlet (113).

And a tension adjuster (124) is provided on the lower cover (120) to adjust the tension of the valve spring (150). At this time, the tension adjuster (124) is made of a structure such as a screw, a set screw, and a bolt, etc., and passes through the central lower part of the lower cover (120) to be screw-coupled to the support hole (121) to which the tension adjuster (124) is screwed. At this time, it is preferable that a tool groove (124a) is formed at the lower end of the tension adjuster (124) or a polygonal head is formed so that the tension adjuster (124) can be easily rotated using a tool such as a screwdriver or a wrench.

According to this structure, when the tension adjuster (124) is rotated in one direction or the other direction, the tension adjuster (124) is lifted and lowered and thus the pressing force pressing the lower end of the valve spring (150) can be adjusted, and accordingly, the tension of the valve spring (150) can be adjusted.

On the other hand, the shaft (160) passes through the pressure chamber (114), the air control passage (115) and the pressure control chamber (116) to be installed vertically lifted and lowered, and in order to maintain airtightness, an O-ring (162) is mounted to prevent the inflow and outflow of air between the pressure chamber (114) and the pressure control chamber (116) through the guide hole (117) in the center of the first body (110).

This lower part of the shaft (160) is coupled to the valve (140) located in the pressure chamber (114) and the upper end protrudes upwardly into the pressure control chamber (116), and when the shaft (160) is lifted or lowered, the valve (140) is also lifted or lowered together.

And the pressure control chamber (116) is provided with a valve seat (170) that is in contact with the upper end of the shaft (160) so as to be lifted or lowered, and the upper side of the valve seat (170) is provided with an adjustment spring (180) that presses the valve seat (170) downward.

In relation to this tension of the adjustment spring (180), when the upper cover (130) is rotated, the bolt (131) coupled to the upper cover (130) rotates and the pressure nut (181) on which the upper end of the adjustment spring (180) is supported moves up and down and thus the tension can be adjusted.

At this time, a support groove (171) is formed at the edge of the valve sheet (170), and a packing (172) that is in close contact with the inner wall surface of the pressure control chamber (116) is inserted such that an upper space and a lower space of the pressure control chamber (116) are separated by the valve sheet (170) to block the inflow and outflow of air between the upper and lower spaces, and when the air from the air outlet (113) side of the first body (110) flows into the pressure control chamber (116) through the connection passage (102a) and the internal pressure increases, the pressure is applied to the upper part of the valve seat (170), and the valve seat (170) can be lowered.

And a packing (173) is provided on a central lower surface of the valve sheet (170) to support an upper end of the shaft (160).

Figure 3:
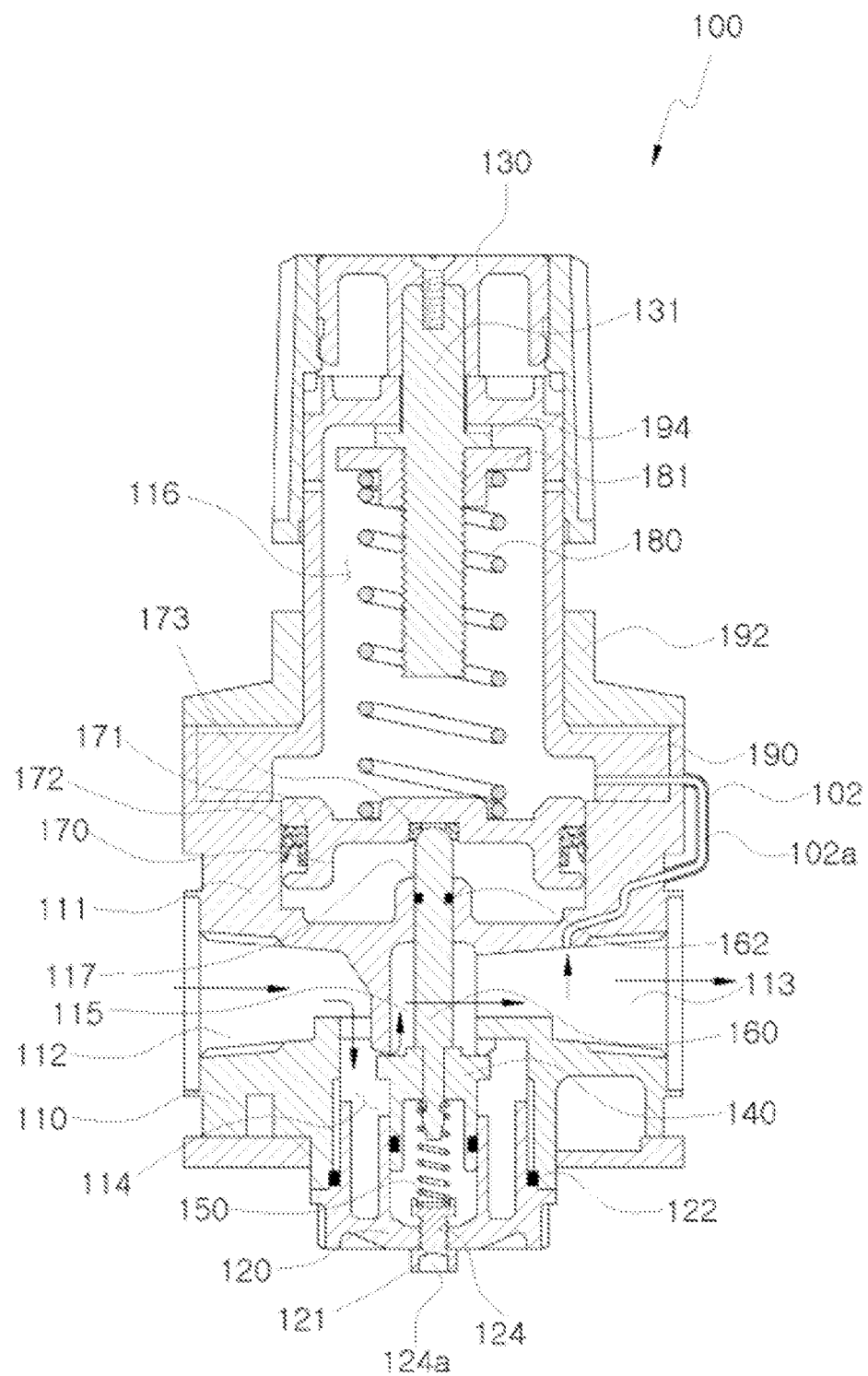
FIG. 3 is a cross-sectional view illustrating a structure of a pneumatic air booster according to a second embodiment of the present invention.

Meanwhile, FIG. 3 is a drawing illustrating another embodiment of the present invention. According to this, the connection passage (102a) that communicates with the air outlet (113) and the pressure control chamber (116) is not formed in the first body (110), but is provided with a connecting pipeline (102) in which a separate connection passage (102a) is formed.

That is, one end of the connecting pipeline (102) is connected to the air outlet (113), and the other end of the connecting pipeline (102) is connected to the pressure control chamber (116). In this structure, one end of the connecting pipeline (102) may be connected to the first body (110) and the other end may be connected to the first body (110) or the bonnet (190) as needed.

Hereinafter, an operation example of the pneumatic air booster according to the present invention will be described with reference to FIGS. 1 to 3.

The valve seat (170) of the pressure control chamber (116) is pushed by the adjustment spring (180) to press the upper end of the shaft (160) while the valve seat (170) is lowered, so that the valve (140) located in the pressure chamber (114) is lowered to keep the entrance of the air control passage (115) open, and the air supplied from the air inlet (112) moves from the pressure chamber (114) through the air control passage (115) to the air outlet (113), and the air is supplied to the pipeline (3) connected to the air outlet (113).

On the other hand, when heavy objects with a high specific gravity such as sand or limestone in the pipeline (3) are stagnant, the pressure inside the pipeline (3) increases, and this pressure rise also affects the air outlet (113). That is, when the pressure of the air outlet (113) increases, the air flows into the pressure control chamber (116) through the connection passage (102a), and when the internal pressure increases, the pressure is applied to the upper part of the valve seat (170) and the valve seat (170) is lowered pressing the upper end of the shaft (160) more strongly, and the valve (140) located in the pressure chamber (114) is further lowered, so the entrance of the air control passage (115) is further opened, and the amount of the air is further increased which moves from the air inlet (112) to the air outlet (113) transferring the objects in the pipeline (3) and thus the pressure inside the pipeline (3) is lowered.

As such, when the pressure inside the pipe line (3) is lowered, the pressure of the air outlet (113) is also lowered, and the air flowed into the pressure control chamber (116) flows back to the air outlet (113) along the connection passage (102a), and the pressure in the pressure control chamber (116) is lowered, the valve (140) is lifted by the pressing force of the valve spring (150) and thus the entrance of the air control passage (115) is reduced.

With such an operating structure of the pneumatic air booster (100) of the present invention, the amount of air supplied from a blower or a compressor can be minimized, and smooth transfer of objects in the pipeline (3) is enabled, and even the impact to the pipeline is also reduced, which is advantageous in maintenance and repair of equipment.

Although the embodiment of the present invention has been described in detail as described above, the scope of the present invention is not limited thereto, and the scope of the present invention extends to the scope substantially equivalent to the embodiment of the present invention.

What is claimed is:

1. A pneumatic air booster (100) which comprises;

a shaft (160) extending in a axis direction, a body (110, 111) surrounding the shaft (160) and including a first body (110) and a second body (111), wherein the second body (111) is coupled to the first body (110) and provided at a higher level than the first body (110) when measured along the axis direction, an air inlet (112) extending from a first sidewall surface of the body (110, 111) to between the first body and the second body (110, 111) in a first radius direction, wherein the first radius direction is perpendicular to the axis direction, an air outlet (113) extending from a second sidewall surface of the body (110, 111) to between the first body and the second body (110, 111) in a second radius direction, wherein the second radius direction is perpendicular to the axis direction, a pressure chamber (114) (i) formed between the first body (110) and the shaft (160) and (ii) communicating the air inlet (112), an air control passage (115) (i) formed between a lower part of the second body (111) and the shaft (160) and (ii) communicating the pressure chamber (114), a pressure control chamber (116) (i) provided over the shaft (160) and over the second body (111) and (ii) vertically aligned with the shaft (160) in the axis direction, a bonnet (190) that is coupled to an upper part of the second body (111) and surrounding the pressure control chamber (116), a lower cover (120) that surrounds the pressure chamber (114), a valve (140) that (i) is installed between the pressure chamber (114) and the shaft (160) and (ii) opens and closes the air control passage (115) to and from the pressure chamber (114), and a valve spring (150) that (i) is vertically aligned under the shaft (160) in the axis direction, (ii) is surrounded by the pressure chamber (114), and (iii) presses the valve (140) upward and downwards in the axis direction, wherein a lower end of the shaft (160) is coupled to the valve (140) and lifts and lowers the valve (140) in the axis direction to open and close the air control passage (115) to and from the pressure chamber (114), wherein a valve seat (170) is provided between the pressure control chamber (116) and supported on and an upper end of the shaft (160) in a manner of being lifted and lowered, wherein the valve seat (170) is open or closed depending on whether being pressed upwards or downwards in the axis direction, wherein a connection passage (102a) is extended between the air outlet (113) and the pressure control chamber (116), wherein the air outlet (113) and the pressure control chamber (116) communicate with each other through the connection passage (102a), wherein, when air in the air outlet (113) flows into the pressure control chamber (116) through the connection passage (102a), a pressure in the pressure control chamber (116) increases, and the valve seat (170) is pushed downward.

2. The pneumatic air booster according to claim 1, further comprising:

a connecting pipeline (102) (i) extending from the pressure control chamber (116) through outside of the second body (111) to the connecting pipeline (102), wherein a distance from the shaft (160) to the connecting pipeline (102) located outside of the second body (111) is farther than a distance from the shaft (160) to the second body (111) when measured along the radius direction, wherein the connection passage (102a) is formed in the connecting pipeline (102), wherein the air outlet (113) and the pressure control chamber (116) are connected to the connecting pipeline (102).

3. The pneumatic air booster according to claim 1, further comprising:

a support hole (121) and a tension adjuster (124), wherein the support hole (121) (i) communicates with the pressure chamber (114), (ii) vertically aligned under the valve spring (150) in the axis direction, and (iii) extending downwards through the lower cover (120) in the axis direction, wherein the tension adjuster (124) adjusts tension of the valve spring (150) and is screwed into the support hole (121).

* * * * *